United States Patent
Singh (10) Patent No.: US 8,577,598 B2
(45) Date of Patent: Nov. 5, 2013

(54) SYSTEM AND METHOD FOR PRESENTING A COMPUTED ROUTE

(75) Inventor: Mona Singh, Cary, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 219 days.

(21) Appl. No.: 13/053,298

(22) Filed: Mar. 22, 2011

(65) Prior Publication Data

US 2011/0172908 A1   Jul. 14, 2011

Related U.S. Application Data (63) Continuation of application No. 12/715,452, filed on Mar. 2, 2010, now Pat. No. 7,991,548, which is a continuation of application No. 11/279,781, filed on Apr. 14, 2006, now Pat. No. 7,702,456.

(51) Int. Cl.
*G01C 21/00* (2006.01)

(52) U.S. Cl.
USPC ........... 701/410; 701/400; 701/424; 701/426; 701/454; 701/455; 340/995.1; 340/995.14; 340/995.21

(58) Field of Classification Search
None
See application file for complete search history.

(56) References Cited

U.S. PATENT DOCUMENTS

| | | | |
|---|---|---|---|
| 5,177,685 A | 1/1993 | Davis et al. | |
| 5,220,507 A | 6/1993 | Kirson | |
| 5,371,678 A | 12/1994 | Nomura | |
| 5,452,212 A * | 9/1995 | Yokoyama et al. | ........... 701/428 |
| 5,493,692 A | 2/1996 | Theimer et al. | |
| 5,528,501 A | 6/1996 | Hanson | |
| 5,659,476 A | 8/1997 | LeFebvre et al. | |
| 5,682,525 A | 10/1997 | Bouve et al. | |
| 5,729,457 A | 3/1998 | Seymour | |
| 5,754,939 A | 5/1998 | Herz et al. | |
| 5,790,976 A | 8/1998 | Boll et al. | |
| 5,802,492 A | 9/1998 | DeLorme et al. | |
| 5,987,380 A | 11/1999 | Backman et al. | |
| 6,014,090 A | 1/2000 | Rosen et al. | |
| 6,023,241 A | 2/2000 | Clapper | |
| 6,047,235 A | 4/2000 | Hiyokawa et al. | |
| 6,049,711 A | 4/2000 | Ben-Yehezkel et al. | |
| 6,098,015 A | 8/2000 | Nimura et al. | |

(Continued)

FOREIGN PATENT DOCUMENTS

JP   09-287970   4/1997

OTHER PUBLICATIONS

Dogru, Muzaffer, "Car Pooling With GIS Map Server and Web Services," Department of Information Technology, University of Zurich, Switzerland, Aug. 6, 2004, pp. 1-83.

(Continued)

*Primary Examiner* — Khoi Tran
*Assistant Examiner* — Jonathan L Sample (57) ABSTRACT

A method for presenting a route includes receiving a starting point and a destination point and computing a route that includes a route segment between the two points. The method further includes determining, based on a user's travel history, whether the route segment is an unfamiliar segment, and identifying, based on the user's travel history, a road that is familiar to the user. The method includes providing, in a format that distinguishes the familiar road from the computed route, the computed route and the familiar road relative to the unfamiliar segment for presentation of the familiar road within a scaled range of the unfamiliar segment.

26 Claims, 5 Drawing Sheets

(56) References Cited

U.S. PATENT DOCUMENTS

| | | | |
|---|---|---|---|
| 6,124,826 A | 9/2000 | Garthwaite et al. | |
| 6,127,945 A | 10/2000 | Mura-Smith | |
| 6,212,474 B1 | 4/2001 | Fowler et al. | |
| 6,249,742 B1 | 6/2001 | Friederich | |
| 6,282,492 B1 | 8/2001 | Gorai et al. | |
| 6,321,158 B1 | 11/2001 | DeLorme et al. | |
| 6,324,467 B1 | 11/2001 | Machii et al. | |
| 6,334,086 B1 | 12/2001 | Park et al. | |
| 6,339,746 B1 | 1/2002 | Sugiyama et al. | |
| 6,349,203 B1 | 2/2002 | Asaoka et al. | |
| 6,366,856 B1 | 4/2002 | Johnson | |
| 6,415,226 B1 * | 7/2002 | Kozak | 701/411 |
| 6,430,498 B1 | 8/2002 | Maruyama et al. | |
| 6,459,987 B1 | 10/2002 | Krull et al. | |
| 6,466,938 B1 | 10/2002 | Goldberg | |
| 6,477,526 B2 | 11/2002 | Hayashi et al. | |
| 6,480,783 B1 | 11/2002 | Myr | |
| 6,484,092 B2 | 11/2002 | Seibel | |
| 6,505,118 B2 | 1/2003 | Chowanic | |
| 6,510,379 B1 | 1/2003 | Hasegawa et al. | |
| 6,526,349 B2 | 2/2003 | Bullock et al. | |
| 6,539,080 B1 | 3/2003 | Bruce et al. | |
| 6,542,749 B2 | 4/2003 | Tanaka et al. | |
| 6,546,336 B1 | 4/2003 | Matsuoka et al. | |
| 6,549,768 B1 | 4/2003 | Fraccaroli | |
| 6,567,743 B1 | 5/2003 | Mueller et al. | |
| 6,577,949 B1 | 6/2003 | Robinson et al. | |
| 6,580,999 B2 | 6/2003 | Maruyama et al. | |
| 6,611,754 B2 | 8/2003 | Klein | |
| 6,618,593 B1 | 9/2003 | Drutman et al. | |
| 6,633,812 B1 | 10/2003 | Martin et al. | |
| 6,654,681 B1 | 11/2003 | Kiendl et al. | |
| 6,662,105 B1 | 12/2003 | Tada et al. | |
| 6,694,252 B2 | 2/2004 | Ukita | |
| 6,721,650 B2 | 4/2004 | Fushiki et al. | |
| 6,721,653 B2 * | 4/2004 | Watanabe et al. | 701/457 |
| 6,748,317 B2 | 6/2004 | Maruyama et al. | |
| 6,762,696 B2 | 7/2004 | Hulverscheidt et al. | |
| 6,765,998 B2 | 7/2004 | Bruce et al. | |
| 6,766,245 B2 | 7/2004 | Padmanabhan | |
| 6,778,903 B2 | 8/2004 | Robinson et al. | |
| 6,813,502 B2 | 11/2004 | Son et al. | |
| 6,820,005 B2 | 11/2004 | Matsuda et al. | |
| 6,895,329 B1 | 5/2005 | Wolfson | |
| 6,961,658 B2 | 11/2005 | Ohler | |
| 7,096,233 B2 | 8/2006 | Mori et al. | |
| 7,123,189 B2 | 10/2006 | Lalik et al. | |
| 7,130,740 B2 | 10/2006 | Vanegas et al. | |
| 7,149,625 B2 | 12/2006 | Mathews et al. | |
| 7,158,876 B2 | 1/2007 | Crook | |
| 7,231,293 B2 | 6/2007 | Lapstun et al. | |
| 7,236,799 B2 | 6/2007 | Wilson et al. | |
| 7,243,134 B2 | 7/2007 | Bruner et al. | |
| 7,271,742 B2 | 9/2007 | Sheha et al. | |
| 7,283,628 B2 | 10/2007 | Stein et al. | |
| 7,333,820 B2 | 2/2008 | Sheha et al. | |
| 7,333,889 B2 | 2/2008 | Hashizume | |
| 7,424,363 B2 | 9/2008 | Cheng et al. | |
| 7,538,691 B2 | 5/2009 | Horstemeyer | |
| 7,590,486 B2 | 9/2009 | Okude et al. | |
| 7,617,542 B2 | 11/2009 | Vataja | |
| 7,624,024 B2 | 11/2009 | Levis et al. | |
| 7,694,156 B2 | 4/2010 | Gammel et al. | |
| 7,698,061 B2 * | 4/2010 | Singh | 701/420 |
| 7,702,456 B2 * | 4/2010 | Singh | 701/425 |
| 7,706,280 B2 | 4/2010 | Raciborski et al. | |
| 7,729,947 B1 | 6/2010 | Philbin et al. | |
| 7,809,500 B2 | 10/2010 | Couckuyt et al. | |
| 7,874,521 B2 | 1/2011 | Shuster | |
| 7,912,642 B2 | 3/2011 | Zhao et al. | |
| 7,991,548 B2 * | 8/2011 | Singh | 701/424 |
| 2001/0019309 A1 | 9/2001 | Saeki et al. | |
| 2001/0029425 A1 | 10/2001 | Myr | |
| 2001/0044310 A1 | 11/2001 | Lincke | |
| 2001/0047241 A1 * | 11/2001 | Khavakh et al. | 701/209 |
| 2001/0056325 A1 | 12/2001 | Pu et al. | |
| 2002/0070862 A1 | 6/2002 | Francis et al. | |
| 2002/0120396 A1 | 8/2002 | Boies et al. | |
| 2002/0128773 A1 * | 9/2002 | Chowanic et al. | 701/210 |
| 2002/0152020 A1 | 10/2002 | Seibel | |
| 2002/0165662 A1 | 11/2002 | Maruyama et al. | |
| 2003/0055558 A1 * | 3/2003 | Watanabe et al. | 701/208 |
| 2003/0105585 A1 | 6/2003 | Ukita | |
| 2003/0109985 A1 * | 6/2003 | Kotzin | 701/209 |
| 2003/0126100 A1 | 7/2003 | Chithambaram | |
| 2003/0144794 A1 | 7/2003 | Schuessler | |
| 2003/0163333 A1 | 8/2003 | Podgurny et al. | |
| 2003/0182052 A1 | 9/2003 | DeLorme et al. | |
| 2003/0191584 A1 | 10/2003 | Robinson et al. | |
| 2003/0195695 A1 | 10/2003 | Maruyama et al. | |
| 2004/0106415 A1 | 6/2004 | Maeda et al. | |
| 2004/0117110 A1 | 6/2004 | Sasajima | |
| 2004/0158393 A1 | 8/2004 | Oonishi et al. | |
| 2004/0172191 A1 | 9/2004 | Vitikainen | |
| 2004/0186661 A1 | 9/2004 | Barton | |
| 2004/0192339 A1 | 9/2004 | Wilson et al. | |
| 2004/0196163 A1 | 10/2004 | Takenaga et al. | |
| 2004/0203902 A1 | 10/2004 | Wilson et al. | |
| 2004/0203903 A1 | 10/2004 | Wilson et al. | |
| 2004/0224702 A1 | 11/2004 | Chaskar | |
| 2004/0225436 A1 | 11/2004 | Yoshihashi | |
| 2005/0043881 A1 | 2/2005 | Brulle-Drews et al. | |
| 2005/0060088 A1 | 3/2005 | Helal et al. | |
| 2005/0064864 A1 | 3/2005 | Horton et al. | |
| 2005/0080556 A1 | 4/2005 | Toelle | |
| 2005/0096840 A1 | 5/2005 | Simske | |
| 2005/0102098 A1 | 5/2005 | Montealegre et al. | |
| 2005/0102101 A1 | 5/2005 | Beesley et al. | |
| 2005/0131628 A1 | 6/2005 | Peeters | |
| 2005/0192742 A1 | 9/2005 | Okochi | |
| 2005/0209773 A1 | 9/2005 | Hara | |
| 2005/0246095 A1 | 11/2005 | Banet et al. | |
| 2005/0256635 A1 | 11/2005 | Gardner | |
| 2005/0278371 A1 | 12/2005 | Funk et al. | |
| 2005/0288859 A1 | 12/2005 | Golding | |
| 2006/0004512 A1 | 1/2006 | Herbst et al. | |
| 2006/0009907 A1 | 1/2006 | Kuroda et al. | |
| 2006/0031007 A1 | 2/2006 | Agnew et al. | |
| 2006/0036363 A1 | 2/2006 | Crook | |
| 2006/0046740 A1 * | 3/2006 | Johnson | 455/456.1 |
| 2006/0047568 A1 | 3/2006 | Eisenberg et al. | |
| 2006/0069500 A1 | 3/2006 | Hashizume | |
| 2006/0069503 A1 * | 3/2006 | Suomela et al. | 701/211 |
| 2006/0080029 A1 | 4/2006 | Kodani et al. | |
| 2006/0080034 A1 * | 4/2006 | Hayashi | 701/211 |
| 2006/0082472 A1 * | 4/2006 | Adachi et al. | 340/995.13 |
| 2006/0085419 A1 | 4/2006 | Rosen | |
| 2006/0129308 A1 | 6/2006 | Kates | |
| 2006/0149461 A1 | 7/2006 | Rowley et al. | |
| 2006/0161599 A1 | 7/2006 | Rosen | |
| 2006/0184313 A1 | 8/2006 | Butler | |
| 2006/0203804 A1 | 9/2006 | Whitmore et al. | |
| 2006/0217879 A1 | 9/2006 | Ikeuchi et al. | |
| 2006/0227047 A1 | 10/2006 | Rosenberg | |
| 2006/0229802 A1 | 10/2006 | Vertelney et al. | |
| 2006/0247849 A1 | 11/2006 | Mohsini et al. | |
| 2006/0247852 A1 | 11/2006 | Kortge et al. | |
| 2006/0265119 A1 | 11/2006 | McMahan et al. | |
| 2006/0265121 A1 | 11/2006 | Kuo et al. | |
| 2006/0287815 A1 | 12/2006 | Gluck | |
| 2007/0032942 A1 | 2/2007 | Thota | |
| 2007/0050129 A1 | 3/2007 | Salmre | |
| 2007/0078596 A1 | 4/2007 | Grace | |
| 2007/0083428 A1 | 4/2007 | Goldstein | |
| 2007/0093955 A1 | 4/2007 | Hughes | |
| 2007/0118278 A1 | 5/2007 | Finn et al. | |
| 2007/0124157 A1 | 5/2007 | Laumeyer et al. | |
| 2007/0155416 A1 | 7/2007 | Donnellan | |
| 2007/0159299 A1 | 7/2007 | Tsai | |
| 2007/0168888 A1 | 7/2007 | Jawerth | |
| 2007/0202844 A1 | 8/2007 | Wilson et al. | |
| 2007/0244633 A1 | 10/2007 | Phillips et al. | |
| 2008/0004043 A1 | 1/2008 | Wilson et al. | |

(56) References Cited

U.S. PATENT DOCUMENTS

2008/0048856 A1 2/2008 Culpepper et al.
2008/0188246 A1 8/2008 Sheha et al.
2008/0319808 A1 12/2008 Wofford et al.

OTHER PUBLICATIONS

Marshall, M., "Destination Known," The Mercury News [online] (Sep. 27, 2004) [retrieved on Aug. 2, 2005] Retrieved from the Internet: <URL: http://www.mercurynews.com/mid/mercury-news/business/9770733.htm?1c> 2 pages.

"GPS Mapping Software" [online] Des Newman's OziExplorer [retrieved on Aug. 2, 2005] Retrieved from the Internet <URL: http://www.ozieplorer.com> 2 pages.

"Off Road Navigation" [online] Thales Navigation, Inc., 2005 [retrieved on Aug. 2, 2005] Retrieved from the Internet: <URL: http://www.magellangps.com/assets/manuals/newprod/manual_ofroadnav.pdf> 21 pages.

"RFID in Japan, Crossing the Chasm, RFID Gets Bendy," Card Korea & Ubiquitous Biz Show 2005 in Seoul [online] (Mar. 17, 2005), [retrieved on Aug. 2, 2005] Retrieved from the Internet: <URL: http://ubiks.net/local/blog/jmt/archives3/003524.html> 2 pages.

"About Google Map Maker," at <http://sites.google.com/site/mapmakeruserhelp/home>, printed May 21, 2009, 1 page.

"AirSage's WiSE Technology," at <http://www.airsage.com/site/index.cfm?id_art=46598&actMenuItemID=22134&vsprache/EN/AIRSAGE_WiSE_TECHNOLOGY_L.cfm>, viewed as early as Mar. 22, 2010, company founded in May 2000, 1 page.

"Club TomTom," at <http://www.clubtomtom.com/general/get-to-know-tomtom-mapshare%E2%84%A2/>, Jul. 31, 2007, copyright TomTom, printed Mar. 12, 2010, 9 pages.

Zahradnik, Fred, "Dash Express is Innovative, but There's Room for Improvement," at <http://gps.about.com/od/incarportablegp1/fr/dash_review.htm>, from the Internet Archive, dated Nov. 8, 2009, printed Apr. 20, 2012, 3 pages.

Millonig, A. and Schechtner, K., "Developing Landmark-based Pedestrian Navigation Systems," Proceedings of the 8th International IEEE Conference on Intelligent Transportation Systems, Vienna, Austria, Sep. 13-16, 2005, copyright 2005, IEEE, 6 pages.

Davies, J. J. et al., "Distributed, vehicular computation for map generation," presentation slides, 2007 Annual Meeting of the Association of American Geographers, Apr. 2007, found at <http://www.cl.cam.ac.uk/research/dtg/www/files/publications/public/jjd27/davies-aag07.pdf>, 21 pages.

"dodgeball.com :: mobile social software," at <http://www.dodgeball.com/>, copyright 2008, Google Inc., printed Jan. 16, 2008, 1 page.

Abstract, Ekpenyong, F., Palmer-Brown, D., and Brimicombe, A., "Extracting road information from recorded GPS data using snap-drift neural network," Neurocomputing, vol. 73, Issues 1-3, Dec. 2009, pp. 24-36, 6 pages.

"Fire Eagle," at <http://fireeagle.yahoo.net>, copyright 2007-2011, Yahoo! Inc., printed Apr. 28, 2011, 2 pages.

"Fire Eagle : What is Fire Eagle?", found at <http://fireeagle.yahoo.net/help> on the Internet Archive, dated Jul. 9, 2011, copyright 2007-2011, Yahoo! Inc., printed Nov. 10, 2011, 4 pages.

Shankland, Stephen, "Google crowdsources maps directions, too," Mar. 11, 2009, at <http://news.cnet.com/8301-17939_109-10193481-2.html>, printed May 21, 2009, 3 pages.

Bruntrup, R. et al., "Incremental Map Generation with GPS Traces," Presentation Slides, University of Dortmund, Germany, 2005, found at <http://www.google.com/url?sa=t&rct=j&q=bruntrup%20incremental%20map%20generation&source=web&cd=2&ved=0CCoQFjAB&url=http%3A%2F%2Fmapgeneration.berlios.de%2Ftiki%2Ftiki-download_wiki_attachment.php%3FattId%3D1&ei=ZruVT_O8J9L16AGV-LGKBA&usg=AFQjCNF4B61uAHpAjtDc46FyNLqw4bgl1A>, 16 pages.

"Intel and ARM collaborate on device security," Oct. 15, 2007, at <http://www.windowsfordevices.com/news/NS5120676853.html>, copyright 1996-2010, Ziff Davis Enterprise Holdings, Inc., printed Apr. 20, 2012, 5 pages.

Ardagna, C.A. et al., "Location Privacy Protection Through Obfuscation-based Techniques," Lecture Notes in Computer Science, 2007, vol. 4602, pp. 47-60, Data and Applications Security XXI, Jul. 8-11, 2007, Redondo Beach, California, 16 pages.

Jones, M., "Matt's Wikimapia Blog," Sep. 15, 2006, at <http://wikimapia.mattjonesblog.com/2006/09/15/how-to-1-adding-a-new-place/>, printed May 21, 2009, 24 pages.

Amin, Saurabh et al., "Mobile Century—Using GPS Mobile Phones as Traffic Sensors: A Field Experiment," 15th World Conference on Intelligent Transportation Systems, Nov. 16-20, 2008, New York, New York, available from <http://www.ce.berkeley.edu/~bayen/conferences/its08.pdf>, 4 pages.

Choney, Suzanne, "Mobile services mushroom for locating friends," Aug. 14, 2008, copyright 2008, MSNBC.com, 1 page.

"MySpace," at <http://www.myspace.com/>, copyright 2003-2008, MySpace.com, printed Jan. 16, 2008, 2 pages.

Priya Ganapati, "Navigation Companies Crowdsource Maps, Traffic Services," Feb. 11, 2009, at <http://www.wired.com/gadgetlab/2009/02/user-generated/>, printed May 21, 2009, 4 pages.

"NAVTEQ: The secrets behind Ovi Maps," at <http://noknok.tv/2009/07/08/navteq-the-secrets-behind-ovi-maps/>, Jul. 8, 2009, copyright 2007-2010, Republic Publishing Ltd, printed Mar. 12, 2010, 6 pages.

Privat, Ludovic, "NAVX: "We provide Content to TomTom, Garmin and Mio,"" GPS Business News, Feb. 2, 2009, at <http://www.gpsbusinessnews.com/NAVX-we-provide-content-to-TomTom,-Garmin-and-Mio-_a1305.html>, printed Apr. 20, 2012, 2 pages.

"Neatcall—Products," found at <http://neatcall.com/index.php?dir=site&page=content&cs=3008> on Internet Archive, dated Mar. 1, 2010, copyright 2010, Neatcall Ltd., printed Oct. 26, 2011, 2 pages.

"OpenStreetMap," <http://www.openstreetmap.org/>, printed May 21, 2009, 1 page.

Davies, J. J. et al., "Scalable, Distributed, Real-Time Map Generation," Pervasive Computing, vol. 5, No. 4, Oct.-Dec. 2006, pp. 47-54, copyright 2006, IEEE, 9 pages.

"Tele Atlas Leverages Community Input to Add New Roads and Location Content," at <http://www.teleatlas.com/WhyTeleAtlas/Pressroom/PressReleases/TA_CT031226>, Jun. 22, 2009, Gent, Belgium, copyright 2010, Tele Atlas BV, printed Mar. 12, 2010, 2 pages.

"TomTom Map Share technology," at <http://www.tomtom.com/page/mapshare>, copyright 2009, TomTom International BV, printed Mar. 12, 2010, 3 pages.

"TrackItBack—The World's Largest Lost & Found Recovery Service | News," articles dating from Mar. 29, 2005, to Jun. 27, 2008, found at <http://www.trackitback.com/portal/press.html>, copyright 2003-2011, TrackItBack, printed on Apr. 18, 2011, 4 pages.

Ekpenyong, F. et al., "Updating of Road Network Databases: Spatio-Temporal Trajectory Grouping Using Snap-Drift Neural Network," In Proceedings of International Conference on Engineering Applications of Neural Networks, EANN 2007, Aug. 29-31, 2007, Thessaloniki, Greece, 10 pages.

Jones, Q. et al., "Urban Enclave Location-Aware Social Computing," Proceeds of Internet Research 7.0: Internet Convergences, Brisbane, Australia, Sep. 27-30, 2006, found at <http://aoir.org/files/c4d0c2e397e8a5ddb140a40f7fa9.pdf>, 10 pages.

"WikiMapia," Wikipedia, at <http://en.wikipedia.org/wiki/WikiMapia>, last modified May 19, 2009, printed May 21, 2009, 4 pages.

* cited by examiner

FIG. 5D ion Ser. No. 12/715,452 titled, "SYSTEM AND METHOD FOR PRESENTING A COMPUTED ROUTE," filed Mar. 2, 2010, now U.S. Pat. No. 7,991,548, which is a continuation of U.S. patent application Ser. No. 11/279,781 titled, "SYSTEM AND METHOD FOR PRESENTING A COMPUTED ROUTE," filed Apr. 14, 2006 now U.S. Pat. No. 7,702,456, which are commonly owned with this application, the entire disclosure of which are here incorporated by reference.

SYSTEM AND METHOD FOR PRESENTING A COMPUTED ROUTE

RELATED APPLICATIONS

This application is a continuation of U.S. patent application Ser. No. 12/715,452 titled, "SYSTEM AND METHOD FOR PRESENTING A COMPUTED ROUTE," filed Mar. 2, 2010, now U.S. Pat. No. 7,991,548, which is a continuation of U.S. patent application Ser. No. 11/279,781 titled, "SYSTEM AND METHOD FOR PRESENTING A COMPUTED ROUTE," filed Apr. 14, 2006 now U.S. Pat. No. 7,702,456, which are commonly owned with this application, the entire disclosure of which are here incorporated by reference.

BACKGROUND

Computer mapping applications allow a user to view maps of regions around the world. Mapping applications typically allow the user to zoom in and zoom out of a map so that the user can explore the region at various levels, e.g., street level, city level, state level. One common feature of the typical mapping application is the ability to compute a route between two locations in response to receiving a starting point and a destination point from the user. Typically, the computed route is highlighted on a map of the region containing the starting and destination points. The user can magnify sections of the map to see the route in greater detail. For example, the map can be magnified to display the streets on the route, as well as the streets surrounding the route. In some cases, the mapping application can also display landmarks and/or points of interest along the route.

The computed route is typically the shortest path between the starting point and destination point. Nevertheless, the mapping application can take into consideration various factors, such as the size of the streets, i.e., the number of lanes, and whether the streets are one way or bi-directional. This mapping data is typically stored in a storage mechanism, locally or remotely, and accessed by the mapping application in computing the route. Thus, the resulting route need not necessarily be the absolute shortest path, but the most practical path under the conditions considered.

Because the mapping data only provides information about the roads, the mapping application does not take into account factors specific to the user. In particular, the mapping application generally does not consider the user's familiarity with the roads on the route and therefore, the computed route can be disorienting for the user if it comprises several unfamiliar segments. To address this concern, some mapping applications track and store the user's preferences and travel history, e.g., the roads traveled by the user, and use the preferences and travel history to compute the route. This approach, however, can be problematic when the resulting computed route is significantly lengthened to accommodate the familiar roads.

SUMMARY

Accordingly, a method and a device for presenting a route are described. According to one exemplary embodiment, a method for presenting a route includes receiving a starting point and a destination point and computing a route that includes a route segment between the two points. The method further includes determining, based on a user's travel history, whether the route segment is an unfamiliar segment, and identifying, based on the user's travel history, a road that is familiar to the user and that is within a scaled range of the unfamiliar segment. The computed route and the familiar road are then presented in a format that distinguishes the familiar road from the computed route, and the familiar road is represented relative to the unfamiliar segment.

According to another exemplary embodiment, a device includes means for receiving a starting point and a destination point, means configured to compute a route that includes a route segment between the two points, means for determining, based on a user's travel history, whether the route segment is an unfamiliar segment, and means for identifying, based on the user's travel history, a road that is familiar to the user and that is within a scaled range of the unfamiliar segment. The device further includes means for presenting the computed route and the familiar road relative to the unfamiliar segment in a format that distinguishes the familiar road from the computed route.

According to another exemplary embodiment, a device comprises a user interface for receiving a starting point and a destination point, and a routing module configured to compute a route that includes a route segment between the two points. The routing module is also configured to determine, based on a user's travel history, whether the route segment is an unfamiliar segment, and to identify, based on the user's travel history, a road that is familiar to the user and that is within a scaled range of the unfamiliar segment. The device also includes a display that presents the computed route and the familiar road relative to the unfamiliar segment in a format that distinguishes the familiar road from the computed route.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

According to one embodiment, a route device receives a starting point and a destination point and computes a route between the two points. The computed route can be divided into a plurality of route segments. Each route segment is analyzed to determine whether the segment is familiar or unfamiliar to the user based on the user's travel history. When a route segment is unfamiliar, a road that is familiar to the user and that is within a scaled range of the unfamiliar segment is identified. After each segment is analyzed, the computed route and the identified familiar road(s) are presented to the user in a format that distinguishes the familiar road(s) from the computed route.

In one embodiment, the computed route can be distinguished from the familiar road(s) in a variety of ways, including, but not limited to, using different colors, line thicknesses, highlighting, line styles, and line flashing to represent the route and the familiar road. In this manner, the computed route can be the most practical route from a starting point to a destination point, and because the user is provided with familiar reference points in otherwise unfamiliar segments of the computed route, the user can feel more comfortable and confident following the computed route.

Figure 1:
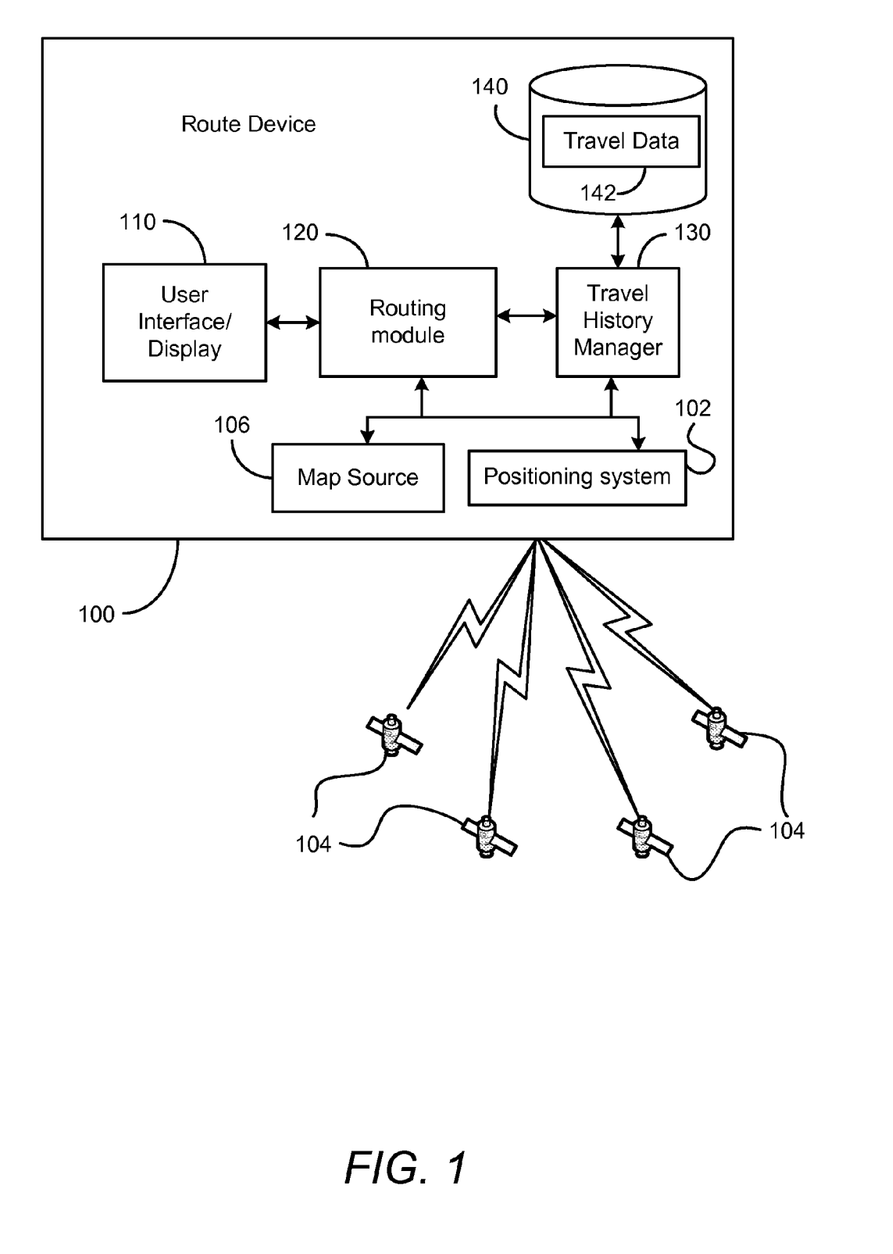
FIG. 1 is a block diagram illustrating an exemplary route device according to an exemplary embodiment.

FIG. 1 is block diagram illustrating an exemplary route device according to an exemplary embodiment. The device 100 includes a means for tracking a position of the device 100. For example, the device 100 can include a positioning system 102 that tracks the position of the device 100. The positioning system 102 can be a well known global positioning system (GPS) that utilizes satellites 104 to determine the device's longitudinal and latitudinal position. The device 100 can also include a map source 106 from which mapping data (not shown) can be retrieved that allows the positioning system 102 to correlate the device's position with a road.

In one embodiment, the device 100 is used in a vehicle that is operated by the user. Accordingly, when the user is traveling in the vehicle, the device 100 is effectively tracking the position of the user and the roads on which the user is traveling.

According to one embodiment, the device 100 includes a means for recording the user's travel history that stores and manages the roads on which the user has traveled. For example, the device 100 can include a travel history manager 130 that is configured to receive travel data 142, i.e., a road on which the user is presently traveling, from the positioning system 102 and to store the travel data 142 in a storage mechanism, such as a database 140. In one embodiment, the travel history manager 130 manages the travel data 142 and tracks how frequently the user has traveled on a road.

In an exemplary embodiment, the device 100 includes a means for computing a route between a starting point and a destination point. For example, the device 100 can include a routing module 120 that is configured to compute a route between the starting point and the destination point. The routing module 120 is coupled to a means for receiving the starting point and the destination point, such as a user interface 110. In one embodiment, the user interface 110 can prompt the user to enter the starting point and the destination point. In another embodiment, the user interface 110 can prompt the user to enter only the destination point, and the routing module 120 can use the present position of the user as the starting point. Given the starting point and the destination point, the routing module 120 can compute a route between the two points by using mapping data retrieved from the map source 106, as is well known in the art.

According to an exemplary embodiment, the routing module 120 is configured to divide the computed route into a plurality of route segments and to determine whether a route segment is unfamiliar to the user based on the travel history of the user. In one embodiment, the routing module 120 uses the travel history manager 130 to search the travel data 142 to determine whether any portion of a route segment matches a road that is familiar to the user. When no portion of the route segment matches a familiar road, the route segment is an unfamiliar segment, and the routing module 120 is configured to identify one or more roads that are familiar to the user and that are within a scaled range of the unfamiliar segment. The computed route and identified familiar road(s) are then presented on a display 110 in a format that distinguishes the familiar road(s) from the computed route such that the user can orient herself in the unfamiliar segment(s) of the computed route.

Although not shown in FIG. 1, the positioning system 102 and map source 106 can be external to the route device 100. In one embodiment, the map source 106 can reside on a server (not shown) communicatively coupled to the positioning system 102 and the route device 100 via a network, such as the Internet. In addition, the travel data 142 can be stored on an external storage mechanism, e.g., database 140, on the network, e.g., the Internet, so that the travel data 142 for a particular user can be retrieved using different route devices 100. Thus, for example, the user can operate a friend's vehicle that is also equipped with the route device 100, and the route device 100 can identify roads familiar to the user, regardless of whether the user is the vehicle's regular user.

Figure 2:
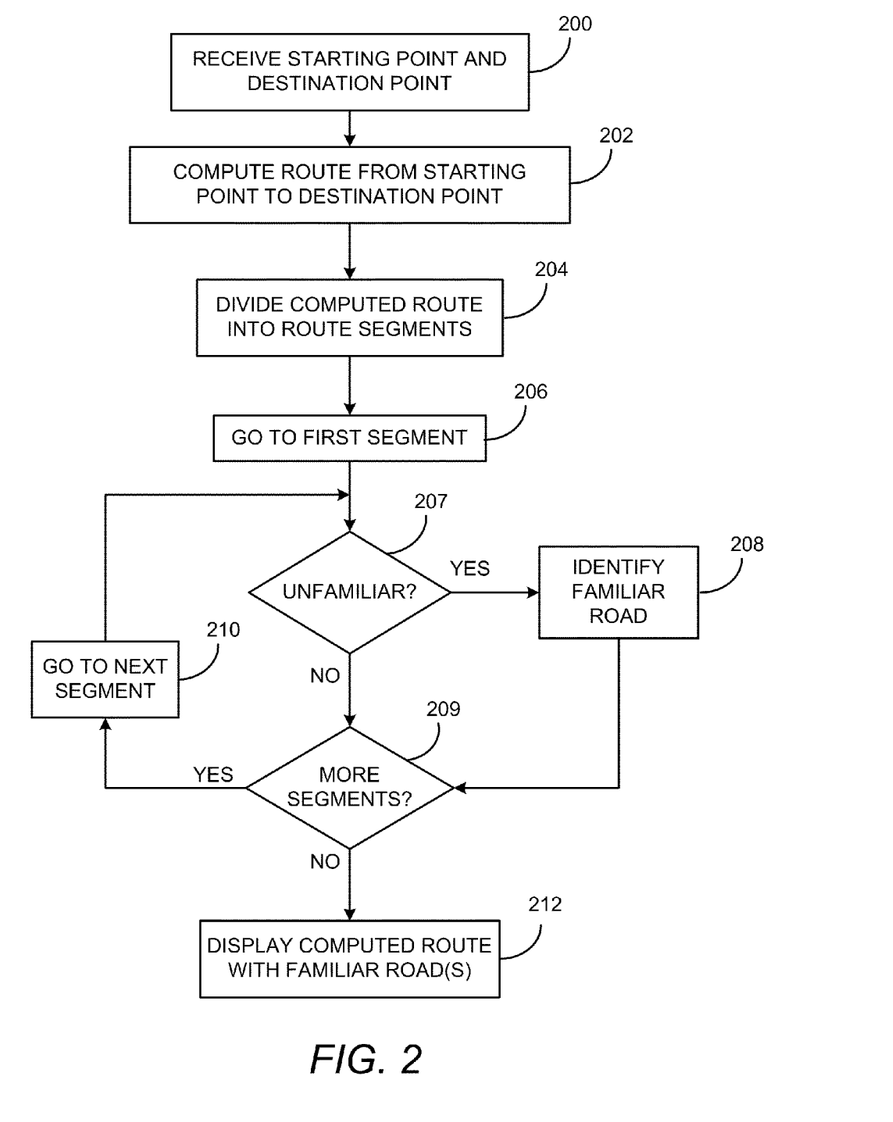
FIG. 2 is a flow diagram illustrating an exemplary process for presenting a route according to an exemplary embodiment.
Figure 5A:
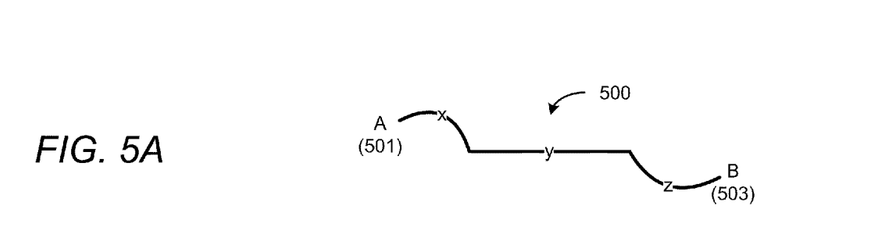
FIGS. 5A-5D are diagrams illustrating an exemplary computed route according to an exemplary embodiment.

FIG. 2 is a flow diagram illustrating an exemplary process for presenting a route using the route device 100 according to one embodiment. Referring to FIGS. 1 and 2, the exemplary process begins when the routing module 120 receives a starting point and a destination point (block 200). As stated above, the user interface 110 can prompt the user to enter the starting and destination points, i.e., addresses, intersections, cities, etc. In another embodiment, the user interface 110 can prompt the user to enter the destination point, and the routing module 120 can retrieve the present position of the user from the positioning system 102 and use the present position as the starting point. Once the starting and destination points have been received, the routing module 120 can compute one or more routes between the two points (block 202) using any well known route computing technique, e.g., shortest distance, shortest distance using wide streets, fastest route, etc. An exemplary route is illustrated in FIG. 5A, where point A represents the starting point 501 and point B represents the destination point 503. If more than one route 500 is computed, the user can be prompted to select a route 500 for presentation.

Figure 5B:
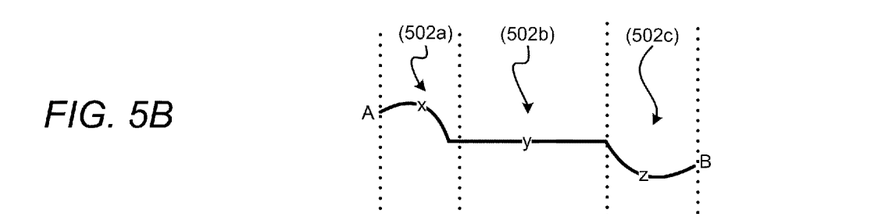

According to an exemplary embodiment, the routing module 120 may divide the (selected) computed route 500 into a plurality of route segments (block 204). For example, as shown in FIG. 5B, the computed route 500 is divided into three (3) route segments, x (502a), y (502b) and z (502c). In one embodiment, the route segments 502a-502c can be equal in length and based on the overall length of the computed route 500. For example, the length of each route segment 502a-502c can be the smaller of a pre-selected fraction of the computed route length, e.g., ⅛ of the total length, or a predetermined length, e.g., 10 miles. In another embodiment, the route segments 502a-502c need not be equal in length, but based on characteristics of the computed route 500 instead. For example, the route segments 502a-502c can be based on a change of direction, or on a change of the road being traversed, or on a change of terrain, e.g., from a valley to mountains, from a city to a suburb. In another embodiment, the route segments 502a-502c can be based on a combination of factors, including but not limited to those mentioned above.

Figure 3:
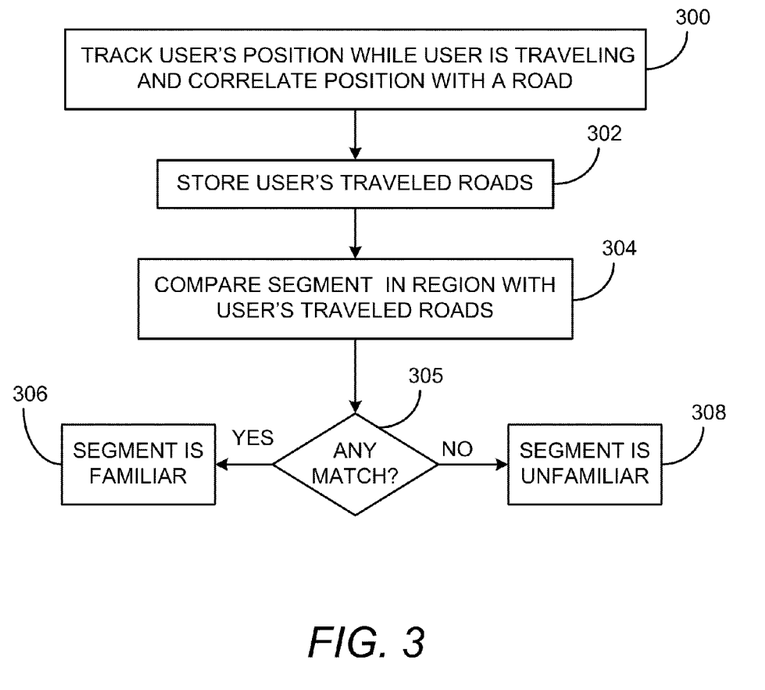
FIG. 3 is a flow diagram illustrating an exemplary process for determining whether a route segment is unfamiliar according to an exemplary embodiment.

Referring again to FIG. 2, after the computed route 500 has been divided into route segments 502a-502c, the routing module 120 analyzes a first route segment (e.g., 502a) (block 206) and determines whether the route segment 502a is unfamiliar to the user (block 207). FIG. 3 is a flow diagram illustrating a process for determining whether the route segment 502a is unfamiliar according to one embodiment.

Referring to FIG. 1 and FIG. 3, the exemplary process begins by tracking the user's position while the user is traveling and correlating the position with a road (block 300). As stated above, the positioning system 102 tracks the position of the user in the vehicle. For example, the positioning system 102 can be a global positioning system (GPS) that uses a receiver in the vehicle to receive broadcasts from GPS satellites 104. Based on signals received from at least three satellites, the positioning system 102 can accurately determine its position in longitudinal and latitudinal coordinates. When coupled with a map source 106, the positioning system 102 can correlate the position with a road. Such positioning systems 102 are well known and are quickly becoming standard components in vehicles.

According to an exemplary embodiment, the roads traveled by the user, i.e., the travel data 142, are collected by the travel history manager 130 and stored in a database 140 (block 302). When the routing module 120 analyzes a route segment 502a to determine whether it is unfamiliar, the routing module 120 parses the route segment into its component roads and uses the travel history manager 130 to compare each road of the route segment with the travel data 142 (block 304). If any road of the route segment matches a road traveled by the user (block 305), the route segment is determined to be familiar (block 306). In one embodiment, the user need not have actually traveled on that particular part of the route segment that matches the road traveled by the user. In other words, the road is familiar to the user so long as the user has traveled on some portion of the matching road. If none of the roads of the route segment match a road traveled by the user (block 305), the route segment is determined to be unfamiliar (block 308).

Referring again to FIG. 2, when the route segment 502a is determined to be an unfamiliar segment (block 207), the routing module 120 identifies, based on the user's travel history/data 142, one or more roads that are familiar to the user and that are within a scaled range of the unfamiliar segment (block 208). In one embodiment, the scaled range is based on the length of the unfamiliar segment. For example, the scaled range can be the smaller of a pre-selected fraction, e.g., ⅕, of the length of the unfamiliar segment and a predetermined distance, e.g., 1 mile. In another embodiment, the user can incrementally expand the scaled range in order to find the nearest familiar road when no familiar roads are identified within the initial scaled range.

Figure 4:
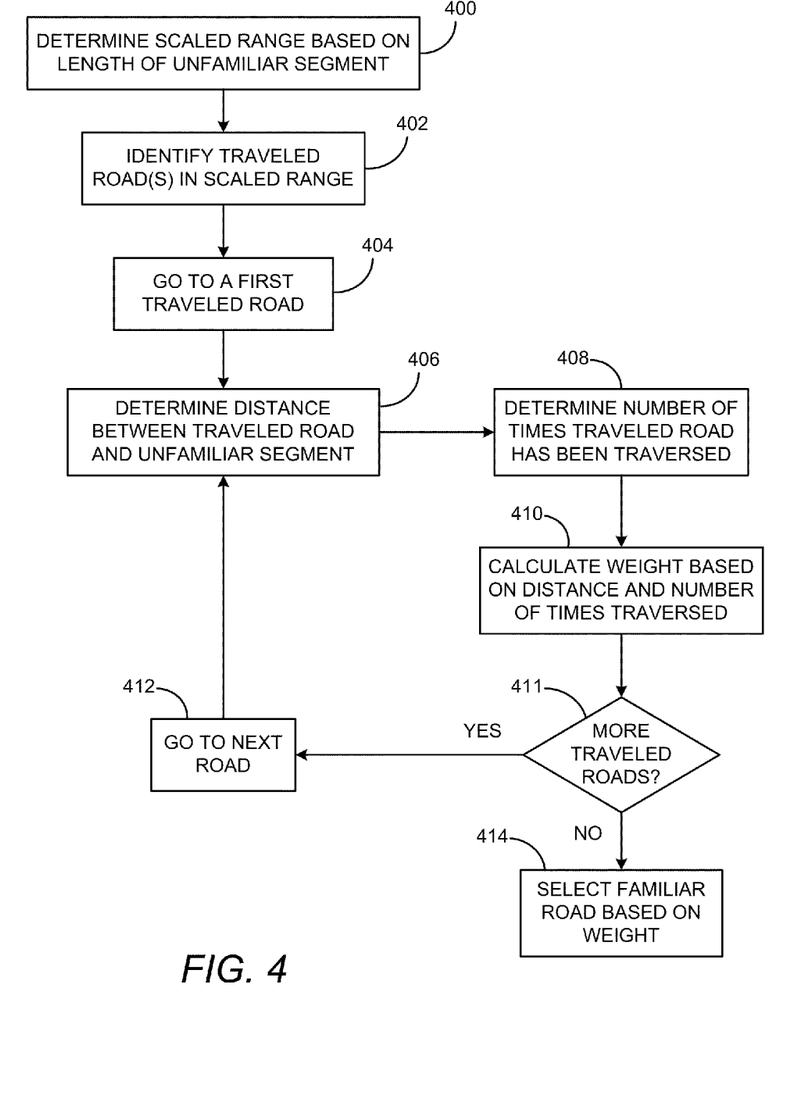
FIG. 4 is a flow diagram illustrating an exemplary process for identifying a familiar road according to an exemplary embodiment.
Figure 5C:
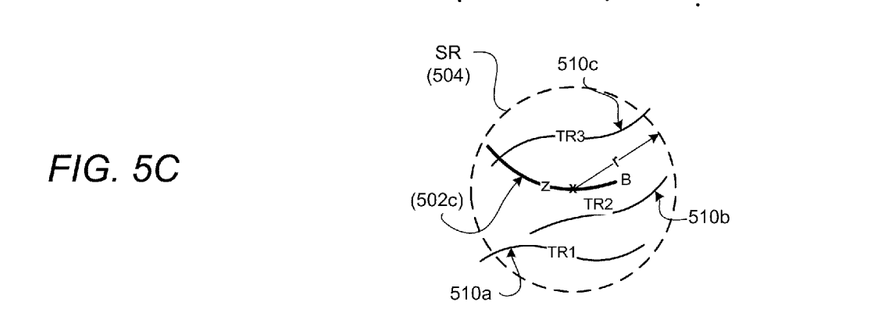

FIG. 4 is a flow diagram illustrating a process for identifying a familiar road according to an exemplary embodiment. Referring to FIG. 1 and FIG. 4, the exemplary process begins by determining the scaled range based on the length of the unfamiliar segment (block 400). In one embodiment, shown in FIG. 5C, the scaled range, SR (504), is a circle with radius, r, around a point on the unfamiliar segment 502c. The radius, r, can be based on the length of the unfamiliar segment. The routing module 120 then identifies roads within the scaled range 504 on which the user has traveled (block 402). In one embodiment, the routing module 120 can use the travel history manager 130 to search the travel data 142 for traveled roads falling within the scaled range 504. As is shown in FIG. 5C, the routing module 120 has identified three (3) traveled roads, TR1 (510a), TR2 (510b), TR3 (510c). As noted above, the portions of the identified traveled roads that fall within the scaled range 504 can be portions on which the user has not actually traveled. Thus, the user need only be familiar with the road name and not necessarily with the portion of the road near the unfamiliar segment.

According to one exemplary embodiment, once the traveled roads 510a-510c have been identified (block 402), the routing module 120 considers a first traveled road, e.g., 510a, (block 404), and determines the distance, d, between the road 510a and the unfamiliar segment 502c (block 406). Then, the routing module 120 determines the number of times, n, the user has traveled on the road 510a (block 408). Based on the distance, d, and the frequency with which the user has traveled on the road 510a, the routing module 120 calculates a weight for the road 510a (block 410). For example, in one embodiment, the weight, W, can be calculated in the following manner:

$$W = n \times 1/(1+d)$$

If more traveled roads exist (block 411), the next traveled road, e.g., 510b, is considered (block 412) and process blocks 406 through 410 are repeated. Once all of the identified traveled roads 510a-510c have been weighted, the routing module 120 can select the familiar road based on its weight (block 414). In addition, the routing module 120 can select the familiar road based only on its distance from the unfamiliar segment, or only on the number of times the user has traveled on that road, or any weighted combination of the two. Alternatively, the routing module 120 can merely select all of the familiar roads that are within the scaled range without regard to ranking them by familiarity or proximity.

Figure 5D:
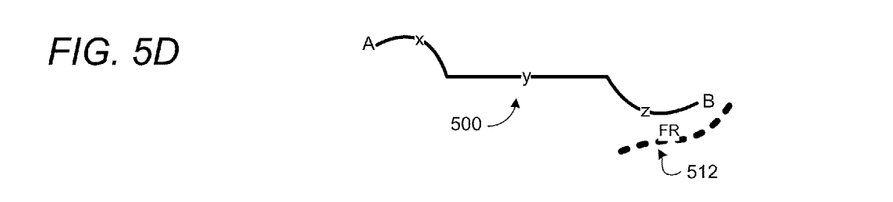

Referring again to FIG. 2, once the one or more familiar roads are identified (block 208), the routing module 120 determines whether more route segments 502a-502c need to be processed (block 209). If such is the case, the routing module 120 proceeds to the next route segment, e.g., 502b, (block 210) and processing blocks 207 and 208 are repeated for each remaining route segment. After all of the route segments 502a-502c have been analyzed, the computed route 500 and the familiar road(s) are displayed to the user (block 212) in a format that distinguishes the familiar roads from the computed route. As stated above, the computed route 500 can be distinguished from the familiar roads in a number of ways, including, but not limited to, using different colors, line thicknesses, highlighting, line flashing and line styles, as is shown in FIG. 5D. In one embodiment, familiar roads are presented using a presentation scheme different from the presentation scheme of the computed route and/or of the surrounding map information. That is, the familiar road or roads can be presented according to a common scheme that differs from the scheme of other elements of the map.

Although FIG. 2 illustrates an example in which the route is divided into multiple segments, it should be understood that dividing the route into segments is optional and the route can, in effect, be processed as a single segment. That is, blocks 204, 209, and 210 may be omitted from the figure and the route can be considered as a single segment without departing from the subject matter described herein.

In one exemplary embodiment, an alternative route can be computed in response to the user selecting one or more of the familiar roads 512. In this embodiment, the alternative route replaces an unfamiliar road in an unfamiliar route segment with the familiar road selected by the user. In this manner, the user can customize the computed route.

The executable instructions of a computer program as illustrated in FIG. 2, FIG. 3 and FIG. 4 can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used here, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electromagnetic, infrared, or semiconductor system, apparatus, device, or propagation medium.

More specific examples (a non-exhaustive list) of the computer readable medium can include the following: a wired network connection and associated transmission medium, such as an ETHERNET transmission system, a wireless network connection and associated transmission medium, such as an IEEE 802.11(a), (b), or (g) or a BLUETOOTH transmission system, a wide-area network (WAN), a local-area network (LAN), the Internet, an intranet, a portable computer diskette, a random access memory (RAM), a read only memory (ROM), an erasable programmable read only memory (EPROM or Flash memory), an optical fiber, a portable compact disc (CD), a portable digital video disc (DVD), and the like.

According to the exemplary embodiments, a computed route from a starting point to a destination point is displayed along with one or more familiar roads near unfamiliar segments of the computed route. By displaying the familiar roads near unfamiliar segments of the route, the user can orient herself with reference to the familiar roads. Accordingly, the user can follow the computed route with more confidence and less anxiety.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for determining a route, the method comprising:
    identifying, by a user device, a plurality of locations of the user device;
    generating a user's travel history including information identifying the plurality of locations of the user device;
    receiving a starting point and a destination point;
    computing a route from the starting point to the destination point, wherein the computed route comprises a route segment;
    determining, based on a user's travel history, that the route segment does not include a location from the plurality of locations, wherein the route segment is an unfamiliar segment;
    identifying, based on the user's travel history, a location from the plurality of locations that is associated with the unfamiliar route segment; and
    providing, in a format that distinguishes the location from the computed route, the computed route and the location relative to the unfamiliar segment for presentation of the location within a scaled range of the unfamiliar segment.

2. The method of claim 1 wherein receiving the starting point comprises determining a present position of the user.

3. The method of claim 1 wherein receiving the starting point and the destination point includes prompting a user to enter the starting point and the destination point.

4. The method of claim 1 wherein computing the route comprises:
    retrieving mapping data from a map source; and
    using the mapping data to create the computed route.

5. The method of claim 1 further comprising determining a plurality of roads on which the user has traveled and storing the plurality of traveled roads to identify a familiar road.

6. The method of claim 5 wherein determining the plurality of traveled roads includes using an electronic positioning system to track the user's position while the user is traveling and using a map source to correlate the user's position with a road.

7. The method of claim 5 wherein identifying the familiar road includes:
    searching the plurality of traveled roads to identify a portion of a traveled road that falls within the scaled range of the unfamiliar segment, wherein the portion of the traveled road within the scaled range is a portion on which the user has not traveled.

8. The method of claim 5 wherein identifying the familiar road includes:
    searching the plurality of traveled roads to identify a portion of a traveled road that falls within the scaled range of the unfamiliar segment, wherein the portion of the traveled road within the scaled range is a portion on which the user has traveled.

9. The method of claim 5 wherein identifying the familiar road includes:
    searching the plurality of traveled roads to identify a plurality of traveled roads that fall within the scaled range of the unfamiliar segment; and
    selecting the familiar road from the identified plurality of traveled roads based on a distance between each of the identified traveled roads and the unfamiliar segment and a frequency with which the user has traveled on each of the identified plurality of traveled roads.

10. The method of claim 1 further comprising:
    determining an alternative route from the starting point to the destination point that includes the location associated with a road that is a familiar road instead of the unfamiliar segment; and
    providing the alternative route for presentation to the user.

11. A system for determining a route, the system comprising:
    a positioning system configured to track the user's position while the user is traveling to identifying, by a user device, a plurality of locations of the user device;
    a storage component configured to store a user's travel history including information identifying the plurality of locations of the user device
    a routing module configured to receive a starting point and a destination point, to compute a route from the starting point to the destination point, wherein the computed route comprises a route segment, to determine, based on a user's travel history, that the route segment does not include a location from the plurality of locations, wherein the route segment is an unfamiliar segment, to identify, based on the user's travel history, a location from the plurality of locations that is associated with the unfamiliar route segment, and to provide, in a format that distinguishes the location from the computed route, the computed route and the location relative to the unfamiliar segment for presentation of the location within a scaled range of the unfamiliar segment.

12. The system of claim 11 wherein the positioning system is configured to determine the starting point based on a current position of a device associated with the user.

13. The system of claim 11 further comprising:
a map source configured to correlate the position of the user with a road on a map; and
the storage component configured to store a plurality of roads on which the user has traveled.

14. The system of claim 13 wherein the routing module is further configured to search the plurality of traveled roads, to identify a plurality of traveled roads that fall within the scaled range of the unfamiliar segment, and to select a familiar road from the identified plurality of traveled roads based on a distance between each of the identified traveled roads and the unfamiliar segment and a frequency with which the user has traveled on each of the identified plurality of traveled roads.

15. A tangible computer readable storage medium containing stored programming instructions for determining a route, the programming instructions for:
identifying, by a user device, a plurality of locations of the user device;
generating a user's travel history including information identifying the plurality of locations of the user device;
receiving a starting point and a destination point;
computing a route from the starting point to the destination point, wherein the computed route comprises a route segment;
determining, based on a user's travel history, that the route segment does not include a location from the plurality of locations, wherein the route segment is an unfamiliar segment;
identifying, based on the user's travel history, a location from the plurality of locations that is associated with the unfamiliar route segment; and
providing, in a format that distinguishes the location from the computed route, the computed route and the location relative to the unfamiliar segment for presentation of the location within a scaled range of the unfamiliar segment.

16. A method for presenting a route, the method comprising:
identifying, by a user device, a plurality of locations of the user device;
generating a user's travel history including information identifying the plurality of locations of the user device;
receiving a route from a starting point to a destination point, wherein the route comprises a route segment;
determining, based on a user's travel history, that the route segment does not include a location from the plurality of locations, wherein the route segment is an unfamiliar segment;
determining, based on the user's travel history, a location from the plurality of locations associated with the unfamiliar segment;
presenting the route; and
in response to determining the location is within a scaled range of the unfamiliar segment, presenting the location relative to the unfamiliar segment in a format that distinguishes the location from the route.

17. The method of claim 16 further comprising determining a plurality of roads on which the user has traveled and storing the plurality of traveled roads to identify a familiar road.

18. The method of claim 17 wherein determining the plurality of traveled roads includes using an electronic positioning system to track the user's position while the user is traveling and using a map source to correlate the user's position with a road.

19. The method of claim 17 wherein identifying the familiar road includes:
searching the plurality of traveled roads to identify a portion of a traveled road that falls within the scaled range of the unfamiliar segment, wherein the portion of the traveled road within the scaled range is a portion on which the user has not traveled.

20. The method of claim 17 wherein identifying the familiar road includes:
searching the plurality of traveled roads to identify a portion of a traveled road that falls within the scaled range of the unfamiliar segment, wherein the portion of the traveled road within the scaled range is a portion on which the user has traveled.

21. The method of claim 17 wherein identifying the familiar road includes:
searching the plurality of traveled roads to identify a plurality of traveled roads that fall within the scaled range of the unfamiliar segment; and
selecting the familiar road from the identified plurality of traveled roads based on a distance between each of the identified traveled roads and the unfamiliar segment and a frequency with which the user has traveled on each of the identified plurality of traveled roads.

22. The method of claim 16 further comprising:
determining an alternative route from the starting point to the destination point that includes the familiar road instead of the unfamiliar segment; and
providing the alternative route for presentation to the user.

23. A system for presenting a route, the system comprising:
a positioning system configured to track the user's position while the user is traveling to identifying, by a user device, a plurality of locations of the user device;
a storage component configured to store a user's travel history including information identifying the plurality of locations of the user device
a routing module configured to receive a route from a starting point to a destination point, wherein the route comprises a route segment, to determine, based on a user's travel history, that the route segment does not include a location from the plurality of locations, wherein the route segment is an unfamiliar segment, determine, based on the user's travel history, a location from the plurality of locations that is associated with the unfamiliar segment; and
a display configured to present the route and, in response to a determination that the location is within a scaled range of the unfamiliar segment, present the location relative to the unfamiliar segment in a format that distinguishes the location from the route.

24. The system of claim 23 further comprising:
a map source configured to correlate the position of the user with a road on a map; and
the storage component configured to store a plurality of roads on which the user has traveled.

25. The system of claim 24 wherein the routing module is further configured to search the plurality of traveled roads, to identify a plurality of traveled roads that fall within the scaled range of the unfamiliar segment, and to select a familiar road from the identified plurality of traveled roads based on a distance between each of the identified traveled roads and the unfamiliar segment and a frequency with which the user has traveled on each of the identified plurality of traveled roads.

26. A tangible computer readable storage medium containing stored programming instructions for determining a route, the programming instructions for:

identifying, by a user device, a plurality of locations of the user device;
generating a user's travel history including information identifying the plurality of locations of the user device;
receiving a route from a starting point to a destination point, wherein the route comprises a route segment;
determining, based on a user's travel history, that the route segment does not include a location from the plurality of locations, wherein the route segment is an unfamiliar segment;
determining, based on the user's travel history, a location from the plurality of locations associated with the unfamiliar segment;
presenting the route; and
in response to determining the location is within a scaled range of the unfamiliar segment, presenting the location relative to the unfamiliar segment in a format that distinguishes the location from the route.

* * * * *